(12) United States Patent
Frederick (10) Patent No.: US 10,922,438 B2
(45) Date of Patent: Feb. 16, 2021

(54) SYSTEM FOR AUTHENTICATION OF REAL-TIME VIDEO DATA VIA DYNAMIC SCENE CHANGING

(71) Applicant: Bank of America Corporation, Charlotte, NC (US)

(72) Inventor: Carl R. Frederick, Lexington, OH (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 428 days.

(21) Appl. No.: 15/928,920

(22) Filed: Mar. 22, 2018

(65) Prior Publication Data
US 2019/0294825 A1    Sep. 26, 2019

(51) Int. Cl.
| H04L 29/06 | (2006.01) |
| G06F 21/64 | (2013.01) |
| H04N 5/14 | (2006.01) |
| H04N 7/18 | (2006.01) |
| H04L 9/14 | (2006.01) |

(52) U.S. Cl.
CPC .......... *G06F 21/64* (2013.01); *H04L 63/1416* (2013.01); *H04N 5/147* (2013.01); *H04N 7/183* (2013.01); *H04L 9/14* (2013.01)

(58) Field of Classification Search
CPC ........ G06F 21/64; H04N 5/147; H04N 7/183; H04N 21/23418; H04N 21/835; H04N 21/8456; H04L 63/1416; H04L 9/14; H04L 63/123; H04L 63/12; H04L 9/3297; H04L 9/0643; H04L 9/0662
See application file for complete search history.

(56) References Cited

U.S. PATENT DOCUMENTS 6,539,055 B1 * 3/2003 Hazra .................. G11B 27/11
                                                              348/700
6,573,907 B1   6/2003 Madrane
                        (Continued)

OTHER PUBLICATIONS

Rubenking, "Who's Watching? Hacked Security Cams Spoof Images, Attack Network"; Aug. 2, 2013, retrieved from the Internet at https://securitywatch.pcmag.com/security/314405-who-s-watching-hacked-security-cams-spoof-images-attack-network, 5 pages.
(Continued)

*Primary Examiner* — Khoi V Le
(74) *Attorney, Agent, or Firm* — Michael A. Springs; Moore & Van Allen PLLC; Seongun M. Hong (57) ABSTRACT

The present disclosure is directed to a novel system that uses a dynamic scene changing element to authenticate real-time video data. In particular, the dynamic scene changing element may alter the video data stream collected a video input device according to a sequence or pattern that is unique for a given timeframe. The system may then compare the expected video stream (based on scene changes created from the unique pattern) with the current video stream. If the system detects that the dynamic scene changes are incorrect or missing, the system may determine that the real-time video data is not authentic, and subsequently take remedial measures. In this way, the dynamic scene changing element allows the system to determine whether the real-time streaming video data is reflective of the current or "true" state of the scene as captured by the video input device.

16 Claims, 3 Drawing Sheets

(56) References Cited

U.S. PATENT DOCUMENTS

| | | | |
|---|---|---|---|
| 7,359,528 B2 | 4/2008 | Rhoads | |
| 7,508,941 B1 | 3/2009 | O'Toole, Jr. et al. | |
| 7,564,992 B2 | 7/2009 | Rhoads | |
| 7,769,806 B2 | 8/2010 | Wie et al. | |
| 8,063,929 B2 | 11/2011 | Kurtz et al. | |
| 8,279,786 B1 | 10/2012 | Smith et al. | |
| 8,295,541 B2 | 10/2012 | Naylor et al. | |
| 8,515,123 B2 * | 8/2013 | Thorwirth | H04N 19/467 |
| | | | 382/100 |
| 9,054,975 B2 | 6/2015 | Feldmann et al. | |
| 9,262,898 B2 | 2/2016 | Champagne et al. | |
| 9,432,390 B2 | 8/2016 | Freeze-Skret | |
| 9,661,276 B2 | 5/2017 | Leblond | |
| 9,805,271 B2 | 10/2017 | Cobb et al. | |
| 10,354,290 B2 * | 7/2019 | Yadav | G11B 27/34 |
| 2003/0098869 A1 | 5/2003 | Arnold et al. | |
| 2004/0246376 A1 | 12/2004 | Sekiguchi et al. | |
| 2007/0005795 A1 | 1/2007 | Gonzalez | |
| 2007/0201694 A1 | 8/2007 | Bolle et al. | |
| 2008/0263610 A1 | 10/2008 | Murray et al. | |
| 2008/0297589 A1 | 12/2008 | Kurtz et al. | |
| 2009/0086021 A1 | 4/2009 | Baier et al. | |
| 2010/0071005 A1 * | 3/2010 | Kusunoki | G06F 16/70 |
| | | | 725/46 |
| 2013/0124508 A1 | 5/2013 | Paris et al. | |
| 2015/0086067 A1 * | 3/2015 | Mehta | G06T 1/0071 |
| | | | 382/100 |

OTHER PUBLICATIONS

TV Tropes, Camera Spoofing, retrieved from the Internet on Jul. 8, 2018 from http://tvtropes.org/pmwiki/pmwiki.php/Main/CameraSpoofing, 7 pages.

Singh et al.; "Real-Time Implementation of Change Detection for Automated Video Surveillance System"; May 9, 2013; retrieved from the Internet at https://www.hindawi.com/journals/isrn/2013/691930/, 4 pages.

* cited by examiner

SYSTEM FOR AUTHENTICATION OF REAL-TIME VIDEO DATA VIA DYNAMIC SCENE CHANGING

FIELD OF THE INVENTION

The present disclosure embraces a system, computer program product, and computer-implemented method for performing authentication of real-time video data. In particular, the system may use dynamic scene changing to create tamper resistant video and verify the authenticity and integrity of real-time video data.

BACKGROUND

In the video security context, there is a need for a more secure way to detect unauthorized tampering of security video feeds in real time.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system that uses a dynamic scene changing element to authenticate real-time video data. In particular, the dynamic scene changing element may alter the video data stream collected by a data collection device such as a video input device (e.g., a security camera, or the like) according to a sequence or pattern that is unique for a given timeframe. The system may then compare the expected video stream (e.g., based on scene changes created from the unique pattern) with the current video stream. If the system detects that the dynamic scene changes are incorrect (e.g., the scene changes do not conform to the unique pattern for a given timeframe) or missing (e.g., the dynamic scene changing element is not present in the scene), the system may determine that the real-time video data is not authentic, and subsequently take remedial measures (e.g., generate an alert). In this way, the dynamic scene changing element allows the system to determine whether the real-time streaming video data is reflective of the current or "true" state of the scene as captured by the video input device.

Accordingly, embodiments of the present disclosure provide a system, a computer program product, and a computer-implemented method for authentication of video data using dynamic scene changing. The invention may comprise receiving streaming video data from a video input device; based on the streaming video data, detecting a presence of a dynamic scene changing element; based on detecting the presence of the dynamic scene changing element, calculating one or more scene change values; calculating one or more expected values via a scene algorithm; comparing the one or more scene change values with the one or more expected values; and determining, based on comparing the one or more scene change values with the one or more expected values, that the streaming video data is authentic.

In some embodiments, calculating the one or more expected values via the scene algorithm comprises providing one or more input values to the scene algorithm, the one or more input values comprising a seed input value. The dynamic scene changing element may be configured to calculate an output value by providing the seed input value to the scene algorithm; and based on the output value, create a change in configuration of the dynamic scene changing element.

In some embodiments, the dynamic scene changing element is a digital display configured to display a string of characters corresponding to the output value. Calculating the one or more scene change values may comprise detecting the string of characters within the streaming video data; and determining a value of the string of characters, wherein comparing the one or more scene change values with the one or more expected values comprises determining whether the value of the string of characters matches an expected value.

In some embodiments, the invention may further comprise detecting, via the streaming video data, the change in configuration of the dynamic scene changing element; based on detecting the change in configuration of the dynamic scene changing element, calculating a second set of one or more scene change values; calculating a second set of one or more expected values via the scene algorithm; and comparing the second set of one or more scene change values with the second set of one or more expected values.

In some embodiments, the invention may further comprise, based on comparing the second set of one or more scene change values with the second set of one or more expected values, determining that the streaming video data is not authentic; and generating an alert configured to notify a user that the streaming video data is not authentic.

In some embodiments, the video input device is a fixed security camera, wherein comparing the one or more scene change values with the one or more expected values comprises detecting a location of the dynamic scene changing element within the streaming video data.

In some embodiments, the dynamic scene changing element is a visible light emitter configured to emit light of a specified color, wherein the specified color corresponds to a specified output value.

In some embodiments, the dynamic scene changing element is a choreographed object configured to change in orientation based on a specified output value.

In some embodiments, the dynamic scene changing element is a sound emitter configured to emit sound of a specified frequency, wherein the specified frequency corresponds to a specified output value.

In some embodiments, the system may comprise a system clock, the system clock being synchronized with a system clock of the dynamic scene changing element, wherein the one or more input values comprises a current time determined by the system clock.

In some embodiments, the dynamic scene changing element is an infrared emitter configured to generate a heat signature, wherein the system further comprises an infrared sensor configured to detect the heat signature, wherein the heat signature correspond to a specified output value.

In some embodiments, the invention may further comprise a second monitoring system comprising a second processor; a second communication interface; and a second memory having executable code stored therein. The executable code, when executed by the second processor, causes the second processor to shut off the second communication interface; receive a second set of streaming video data from a second video input device, wherein the second video input device is configured to record a display of a first monitoring system; based on the second set of streaming video data, detect the presence of the dynamic scene changing element; based on detecting the presence of the dynamic scene changing element, calculate one or more additional scene change values; calculate the one or more expected values via the scene algorithm; and compare the one or more additional scene change values with the one or more expected values.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the real-time video data authentication system described herein is implemented. The entity may be a business organization, a non-profit organization, a government organization, and the like.

"Entity system" or "authentication system" as used herein may refer to the computing systems and/or other resources used by the entity to collect authentication data and run the various processes needed to identify a user and/or inconsistencies in the collected authentication data.

"User" as used herein may refer to an individual who may interact with the entity system. Accordingly, the user may be an employee, associate, contractor, or other authorized party who may use the video authentication system to verify the integrity and/or authenticity of streaming video data.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop, or the computing system may be a stationary unit such as a personal desktop computer or networked terminal within an entity's premises. In some embodiments, the computing system may be a local or remote server which is configured to send and/or receive inputs from other computing systems on the network.

Embodiments of the present disclosure provide a system, computer program product, and method for authentication of real-time video data. In particular, the system may comprise one or more data collection devices such as video input devices (e.g., video capture devices, such as security video cameras, image capture devices, or the like) configured to capture video, audio, and/or image data from a scene and operatively connected to one or more computing systems. The video input devices, associated computing systems, and other peripheral devices may be referred to herein as the "monitoring system." For example, the system may comprise a plurality of security video cameras which are oriented to capture real-time video data of an object and/or area of interest for surveillance purposes. It should be understood that the video input devices may capture streaming video in real-time (e.g., instantaneously, or near-real time with a slight delay), may capture a series of static images over a time interval, or the like. The system may further comprise one or more dynamic scene changing elements to modify the video, audio, and/or image data. As used herein, "dynamic scene changing element" or "scene changing element" may refer to a physical or non-tangible object which may create variations in the video, audio, and/or image data streams captured by the video input devices of the system. In some embodiments, the dynamic scene changing element may be a dynamic scene changing device (e.g., a physical device such as a visible or non-visible light emitters and/or detectors, a digital display, sound emitter, choreographed object in motion, and the like). In other embodiments, the dynamic scene changing element may be a non-tangible object (e.g., video/image overlay, projected light, a projected image, and the like).

In some embodiments, the dynamic scene changing element may alter the scene captured by the video input devices (and therefore the video, audio, and/or image data) according to a unique sequence or pattern. Said sequence or pattern may be unique for a given time or timeframe such that the video stream for the given time or timeframe contains unique scene changes created by the dynamic scene changing element. The unique sequence or pattern may be shared between the dynamic scene changing element and the monitoring system such that the monitoring system is able to calculate "expected values" of the scene changes caused by the dynamic scene changing element. The monitoring system may then compare the calculated "expected values" to the values detected from the scene changes in the current streaming video/audio/image data. If the expected values are consistent with the values detected from the scene changes, the monitoring system may determine that the current streaming data represents the scene as it exists at the current time. However, if the values detected from the scene changes are inconsistent with the expected values or are altogether missing, the system may determine that the current streaming data is not representative of current reality and subsequently take remedial actions as necessary. The detected values from the streaming data may be considered to be inconsistent, for example, if the detected values are incorrect (e.g., the expected value is "00000F" but the detected value is "00000D", or any other like value), or if the detected values do not appear in the expected location (e.g., the video input device is a fixed camera such that detected values should always appear in the bottom left corner, at a particular angle, or the like).

For example, if the dynamic scene changing element is a digital display, the digital display may display a value or string (e.g., a numerical value or hash) which is unique to a particular time or timeframe (e.g., 6:00 PM on a particular day). The digital display may be displayed on the scene (e.g., on a wall) or on an object of interest (e.g., a lock box or safe). In such embodiments, the value may be updated continuously updated (e.g., every second) according to an algorithm such as a random number generator or hash algorithm. In some embodiments, the algorithm may use various inputs and/or seed values (e.g., the time of day) to generate unique values for a given time or period of time. The algorithm and/or seed data may be utilized by both the dynamic scene changing element and the monitoring system, such that the monitoring system is able to determine expected values for any given period of time (e.g., the monitoring system and the dynamic scene changing element are in sync). If the pattern shown in the video/audio data does not match expected values (e.g., the values shown by the digital display are incorrect for a given time frame), the monitoring system may determine that the video input device and/or the video/audio data have been improperly modified. In some embodiments, the scene changing element and the monitoring systems may use certificates or cryptographic keys (e.g., public and/or private keys) to generate encrypted seed values and decrypt seed values. In such embodiments, the dynamic scene changing element may be configured to encrypt the seed values (e.g., using a private key) such that the monitoring system may decrypt the seed values (e.g., with a public key). By encrypting the keys within the dynamic scene changing device, the system may help prevent a potential attacker from obtaining the seed values from the dynamic scene changing device (e.g. preventing the attacker from obtaining the key in plaintext by accessing the dynamic scene changing device's file system).

Other types of dynamic scene changing elements may create different types of scene changes which may be detected by the monitoring system. For example, the dynamic scene changing element may be a light emitter which produces a pattern of light which varies in intensity, timing, wavelength (e.g., color), and the like. The emitted light may be detected through the video/audio stream and/or a light detector, which may be incorporated into the video input device. In other embodiments, the light emitter may project a light image onto the scene or object within the scene, where the light image may have different shapes, colors, sizes, and the like, according to a unique sequence or pattern. In other embodiments, the dynamic scene changing element may be an audio generating device, which may generate a unique sound (which may vary in pitch, amplitude, timing, etc.) that may be detected by the video input devices. In yet other embodiments, the dynamic scene changing element may be a physical choreographed object which may be configured to change position or orientation over a period of time according to a unique pattern (e.g., rotate in different directions, vibrate, swing, etc.). In yet other embodiments, the dynamic scene changing element may be a non-visible light emitter paired to a non-visible light detector (e.g., an infrared emitter and sensor). It should be understood that the system may incorporate one or any combination of dynamic scene changing elements as described herein.

The monitoring system may be configured to take certain remedial actions upon determining that the detected values from the scene changes of the streaming data are inconsistent with expected values or are missing from the streaming data. For instance, the monitoring system may be configured to generate an alert notifying the user of the inconsistency of the streaming data. The alert may be an audible alert (e.g., an alarm, a speech alert, etc.), a notification (e.g., e-mail, phone call, text message, or the like), or a visual alert (e.g., a flashing or blinking interface item), among other possibilities. In some embodiments, the monitoring system may be configured to create a record of detected inconsistencies within a database, where the record indicates the time or timeframe of the inconsistency and the nature of the inconsistency (e.g., wrong values, values are missing, values are in the wrong place within the scene, etc.).

The real-time video data authentication system as disclosed herein addresses a number of technology-centric challenges. In particular, using dynamic scene changing according to a unique pattern may help reduce the incidence of "replay attacks," in which an image or video of the scene (e.g., a still photo or video loop of the scene) as it existed previously is used to replace the image or video of the scene as it currently exists (e.g., the streaming data reflects a non-current state of the scene), which in turn increases the security and integrity of streaming security video, image, and/or audio data. Furthermore, invention may, by detecting attempts to improperly access the security video stream, be able to mitigate the amount of damage that the malicious users may cause to the security system, which may include data corruption, data manipulation, misallocation of computing resources (e.g., processing power, memory space, storage space, cache space, electric power, networking bandwidth, etc.), and the like.

Figure 1:
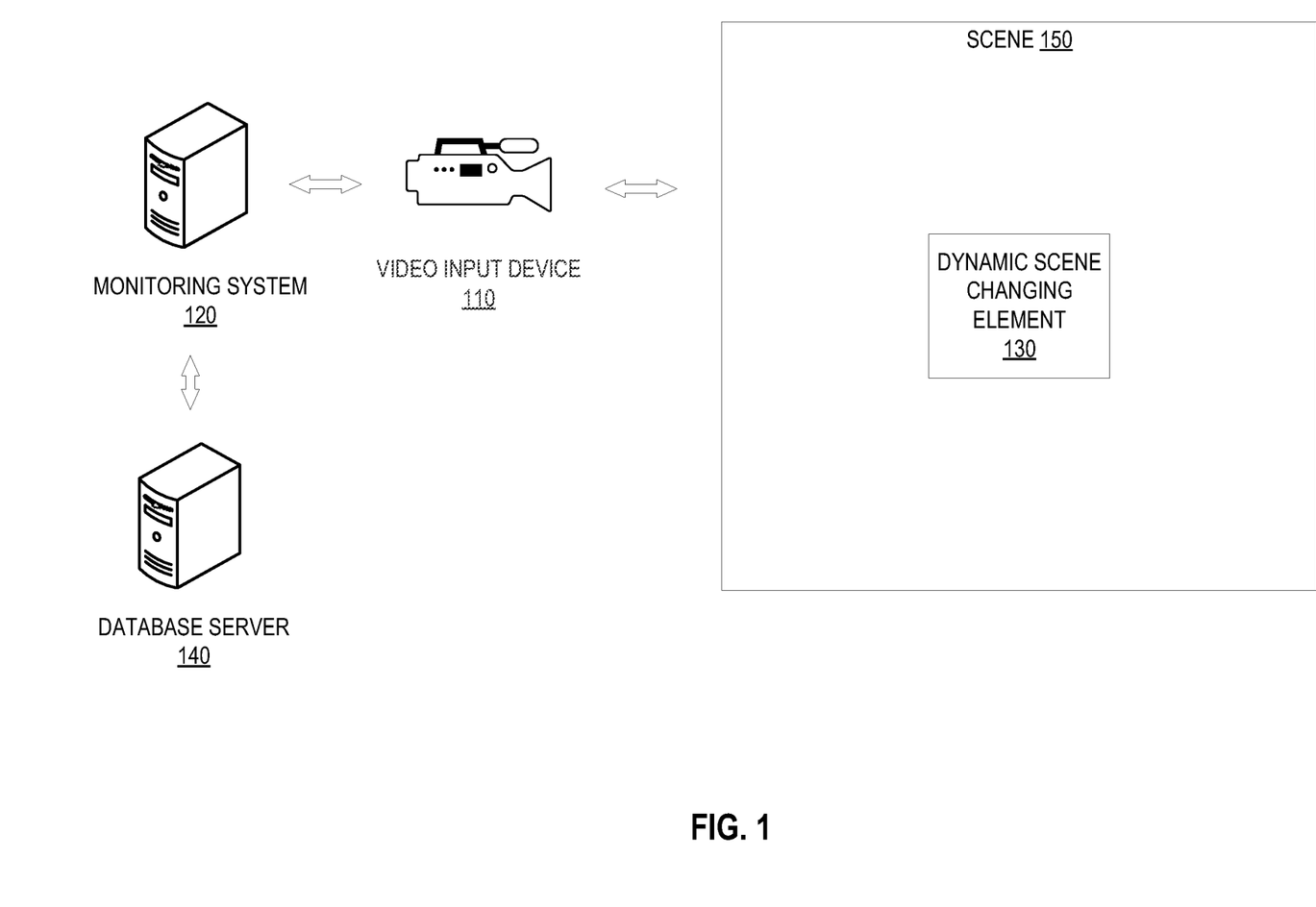
FIG. 1 is a block diagram illustrating an operating environment for the real-time video data authentication system, in accordance with some embodiments of the present disclosure.

FIG. 1 is a block diagram illustrating an operating environment for the real-time video data authentication system, in accordance with some embodiments of the present disclosure. In particular, the operating environment may include one or more data collection devices (e.g., a video input device, an audio input device, or the like). For the purposes of FIG. 1, a video input device 110 is shown in operative communication with a monitoring system 120, which may be in operative communication with a database server 140. That said, it should be understood that other types of data collection devices may be used in the place of and/or in addition to the video input device 110 as described in the present disclosure.

In some embodiments, the components as depicted in FIG. 1 may be directly connected via data transmission cables (e.g., Ethernet cables, or the like). In other embodiments, the components may be in operative communication over a network. The network may also be a global area network (GAN), such as the Internet, a wide area network (WAN), a local area network (LAN), or any other type of network or combination of networks. The network may provide for wireline, wireless, or a combination wireline and wireless communication between devices on the network. The video input device 110 may be a device that is configured to capture video, audio, image, or other types of data from a scene 150. Accordingly, the video input device 110 may be, or include, a video camera, microphone, photographic device, or other device that captures contemporaneous (e.g., streaming video, image, sound, or the like) data of the scene 150. The video input device 110 may continuously capture data in real-time, may operate on a delay, and/or may capture static images for a period of time. Regardless of how the video input device operates, the scene 150 may comprise a location, environment, setting, and/or object for which streaming data is to be recorded and/or collected. The video input device 110 may be oriented and/or configured to capture streaming media data of the scene 150. For example, if the video input device 110 is a video camera, the video camera may be oriented, angled, and/or positioned such that the video camera is able to capture video, image, and/or audio data of the scene 150. In some embodiments, the video camera may be a fixed camera such that the video camera obtains streaming video data of the scene at a fixed angle. In other embodiments, the video camera may pan or swivel such that the video camera captures streaming video data of the scene across a range of angles.

The scene 150 may further comprise a dynamic scene changing element 130, which may be an object which causes a change in the streaming data captured about the scene 150 (which may be referred to herein as "streaming scene data"). In some embodiments, the dynamic scene changing element 130 may be a physical device or object such as a display (e.g., a screen or other device that displays a string of numbers, letters, or other characters or values), choreographed object, visible or non-visible light emitter or projector, sound emitter, and the like. In other embodiments, the dynamic scene changing element 130 may be a non-physical object such as a video overlay, projected light (e.g., an image, a colored beam, etc.), or the like.

The dynamic scene changing element 130 may be configured to create changes in the streaming scene data in various different ways. For example, a digital display may create a change in the streaming scene data by periodically changing a displayed value, where the displayed value may be calculated by inputting a seed value into a unique algorithm. If the dynamic scene changing element 130 is a light emitter, the emitter may produce light of varying characteristics over time (e.g., light that varies in intensity, frequency, timing, color, etc.), where the characteristics of the emitted light may be varied according to the output of an algorithm. In such embodiments, the changes in the streaming scene data caused by a displayed value and/or the emitted light may be detected by the monitoring system by analyzing the video data. For instance, if the displayed value comprises numbers, letters, or other types of characters, the monitoring system may use optical character recognition ("OCR") technology to detect the characters within the displayed value. In other embodiments, the monitoring system may extract pixel attributes within the video data (e.g., brightness, color, saturation, etc.) to determine the attributes of the emitted light. In embodiments in which the dynamic scene changing element 130 is a non-visible light emitter (e.g., an infrared emitter), the video input device 110 may comprise a non-visible light detector which corresponds with the non-visible light emitter (e.g., an infrared sensor, or the like), which may be used to detect patterns in the emitted infrared light.

In an exemplary embodiment, the video input device 100 may comprise an infrared sensor that is configured to detect a thermal image and/or heat signature of the scene and/or the dynamic scene changing element 130, which may be an infrared emitter which may be configured to generate infrared light of varying intensities and/or frequencies based on the outputs of the scene algorithm. The monitoring system 120, by receiving the data from the infrared sensor of the video input device 100, may compare the received data with expected values for the infrared light for a given time or timeframe. By including pattern detection of non-visible elements (e.g., infrared light), the authentication system may be provided an additional layer of security.

As noted above, the dynamic scene changing element 130 may create changes in streaming scene data according to a unique pattern or sequence as determined by an algorithm. In some embodiments, seed values may be input into the algorithm to determine an output value (e.g., a character string, light pattern, sound pattern, object movement pattern, etc.) which will in turn determine a unique variation in the streaming scene data for a given period of time. For instance, the time of day, a device ID, unique entity identifiers, and the like may be used by the system as seed values for the algorithm. In some embodiments, the monitoring system 120 and the dynamic scene changing element 130 may be configured to use the same seed values and the same algorithm. In such embodiments, the monitoring system 120 is able to calculate expected values from the changes to the streaming scene data caused by the dynamic scene changing element 130. For example, if the dynamic scene changing element 130 is a digital display which displays a value of "1357" at a certain period of time, the monitoring system 120 may be able to confirm that the displayed value should be "1357" for the given period of time because both the monitoring system 120 and dynamic scene changing element 130 use the same algorithm and input values (e.g., the monitoring system 120 is able to calculate that the expected value for the given time frame should be "1357" and further is able to detect that the expected value of "1357" matches the displayed value of "1357" in the current streaming scene data). The input values may include a "seed input value," which may serve as an initial input value to the algorithm to produce a certain sequence of output values. In some embodiments, the seed input value may be designated by the entity. In some embodiments, the dynamic scene changing element 130 may be integrated into the video input device 110. In such embodiments, the dynamic scene changing element 130 may produce changes in the streaming scene data by creating an image overlay on the streaming video data recorded by the video input device (e.g., a character string in a corner of the streaming video, or the like). That said, embodiments in which the only dynamic scene changing element 130 used by the system is an image overlay, such embodiments may be susceptible to certain types of video manipulation attacks (e.g., a still image attack, a video loop attack, or the like).

In some embodiments, the system may use both an image overlay in the streaming video data as well as a dynamic scene changing element 130 that is present within the scene. In an exemplary embodiment, the image overlay may be a first string of characters which may be appended to the video data by the video input device 110, while the dynamic scene changing element 130 may be a digital display which displays a second string of characters. In such embodiments, the configuration of the image overlay (e.g., the first string of characters) may be changed based on a first algorithm, and the configuration of the dynamic scene changing element 130 (e.g., the second string of characters) may be changed according to a second algorithm. The monitoring system 120 may use both the first algorithm and the second algorithm in addition to their corresponding seed input values to ensure that the first string of characters matches expected values for the image overlay, while the second string of characters matches expected values for the dynamic scene changing element 130.

In some embodiments, the dynamic scene changing element 130 may be a light image projection onto the scene 150 by a device that may be present outside of the scene 150 itself. In some embodiments, the scene 150 may comprise an object that the entity wishes to keep under surveillance (e.g., a safe, lockbox, valuable artifact, or the like). In such embodiments, the dynamic scene changing element 130 may be a light image or hologram (e.g., a 10×10 grid of colored squares, characters in the squares, different shapes, or the like) which is projected directly onto the object of interest. The properties of the squares within the grid (e.g., color, intensity, images, size, shape, or the like) may be varied according to the output of the unique algorithm. In some embodiments, the light image may be projected onto the object such that the light image changes shape to conform to the object. In an exemplary embodiment, a 10×10 grid of squares may be projected onto an object such as a priceless vase, which may have a rounded body. If the vase is moved or is altogether missing, the monitoring system 120 may be able to detect that the object has been moved based on the expected shape of the grid of squares versus the distorted shape of the grid of squares caused by a movement of the vase.

In some embodiments, the dynamic scene changing element 130 may make changes in the streaming scene data periodically over time (e.g., one time per a fraction of a second, a second, any number of seconds, minutes, or the like). For example, the dynamic scene changing element 130 may make a change in the streaming data (e.g., display a certain calculated value) at a particular time (e.g., at t=0 seconds), where the calculated value may be the output of the unique algorithm, which may take into account the current time. The change in the streaming data (e.g., the display of the calculated value) may persist until it becomes time to update the streaming scene data (e.g., at t=1 second), at which point the dynamic scene changing element 130 may change the calculated value using the unique algorithm. In other words, the streaming scene data (e.g., video data, or the like) may show a first calculated value at 0 seconds, then subsequently a second calculated value at 1 second. In some embodiments, the frequency with which the streaming scene data is updated by the dynamic scene changing element 130 may depend on the hardware capabilities of the video input device 110, the monitoring system 120, and/or the scene changing element 130. For example, if the video input device 110 is configured to capture video data at a relatively high frame rate (e.g., 144 frames per second), the dynamic scene changing element 130 may be configured to create changes in the streaming scene data at a relatively higher frequency than if the video input device 110 is configured to capture video data at a relatively low frame rate (e.g., 24 frames per second).

The monitoring system 120 may be one or more computing systems which receive, analyze, and/or interpret the streaming scene data provided by the video input device 110. Accordingly, the monitoring system 120 may be a networked terminal, desktop computer, laptop, server, or the like, or combination thereof. In some embodiments, the monitoring system 120 may be a surveillance computing system which may include one or more output devices (e.g., screen, projector, speaker, etc.) that is configured to display or otherwise represent the streaming scene data. In such embodiments, the monitoring system 120 may be configured to interact with a user, such as administrators, security personnel, and the like, such as by receiving inputs through various input devices (e.g., keyboards, mice, touch screens, etc.). In some embodiments, the monitoring system 120 may comprise other devices such as an audible alarm, a visual alarm such as a rotating light, and the like. In some embodiments, the monitoring system 120 may further comprise an internal clock which is synchronized with an internal clock within the dynamic scene changing element 130 (e.g., via a centralized timekeeping server or device).

The database server 140 may comprise one or more data storage repositories which may be used to store various types of data collected or created by the video data authentication system. In some embodiments, the system may store at least a portion of the streaming scene data to the database server 140. The database server 140 may further comprise a ledger of events, alerts, exceptions, or other occurrences recorded by the monitoring system 120. For example, the database server 140 may comprise a record of instances in which the monitoring system 120 has detected a mismatch in expected values versus the detected values from the streaming scene data.

It should be understood by those having ordinary skill in the art that although the video input device 110, the monitoring system 120, the dynamic scene changing element 130, and the database server 140 are depicted as single units, each of the depicted components, or sub-components therein, may represent multiple units. In some embodiments, a given computing system as depicted in FIG. 1 may represent multiple systems configured to operate in a distributed fashion. For instance, the monitoring system 120 and/or the database server 140 may each represent a plurality of computing systems operating in a distributed fashion. In other embodiments, the functions of multiple computing systems may be accomplished by a single system. For instance, the functions of the monitoring system 120 and the database server 140 may, in some embodiments, be executed on a single computing system according to the entity's need to efficiently distribute computing workloads.

In some embodiments, the system may comprise multiple dynamic scene changing elements 130 for a scene 150. For instance, the system may use a first dynamic scene changing element 130 such as a digital display and a second dynamic scene changing element 130 such as a choreographed object. In such embodiments, first and second dynamic scene changing elements 130 may share a common algorithm and/or seed input values with the monitoring system 120. The monitoring system 120 may then use the seed input values and the common algorithm to calculate expected values for both the first and second dynamic scene changing elements 130. In other embodiments, the first dynamic scene changing element 130 may use a different algorithm and/or seed input values from the second dynamic scene changing element 130. In such embodiments, the monitoring system 120 may use a first algorithm and/or a first set of seed input values to calculate a first expected value for the first dynamic scene changing element 130, and use a second algorithm and/or second set of seed input values to calculate a second expected value for the second dynamic scene changing element 130.

In some embodiments, the system may comprise multiple video input devices 110, which may each be positioned, oriented, angled, or otherwise configured to capture streaming scene data from different perspectives. In this way, even if one video input device 110 is unable to detect the dynamic scene changing element 130 (e.g., an object temporarily obstructs the view of the dynamic scene changing element 130 from a particular perspective), another video input device 110 may be able to detect the dynamic scene changing element 130 from a different perspective.

In some embodiments, the system may comprise multiple monitoring systems 120 separated by an "air gap" (e.g., a first monitoring system 120 may not be connected to an additional monitoring system via a communication interface). For example, the system may comprise a scene that is recorded via a first video input device 110 connected to a first monitoring system 120. A display of the first monitoring system 120 (e.g., a security guard monitor) may in turn be recorded by a second video input device connected to a second monitoring system. In such embodiments, the second monitoring system 120 may use the same algorithm and seed input values as the ones used by the dynamic scene changing element 130 and be configured to detect scene change values from the display of the first monitoring system 120. In other embodiments, the second monitoring system may use a different set, subset, or superset of seeds and/or keys to validate the scene. By detecting the scene change values from the display of the first monitoring system 120, the second monitoring system may verify that the detected values are consistent with the expected values for a given timeframe as calculated using the algorithm and seed input values. In this way, the system may be able to detect attacks which target the display of the first monitoring system 120. In some embodiments, the second monitoring system may be configured to disable one or more communication interfaces (e.g., Ethernet, Wi-Fi, USB, or the like). In this way, the second monitoring system may reduce its available attack surfaces such that a potential attacker may be prevented from improperly manipulating the second monitoring system from a remote location. In some embodiments, the dynamic scene changing element 130, the first monitoring system 120, and the second monitoring system may each use the same algorithm and seed input values to determine expected values for a given timeframe. In other embodiments, only the dynamic scene changing element 130 and the second monitoring system may use the algorithm and seed input values to determine expected values.

Figure 2:
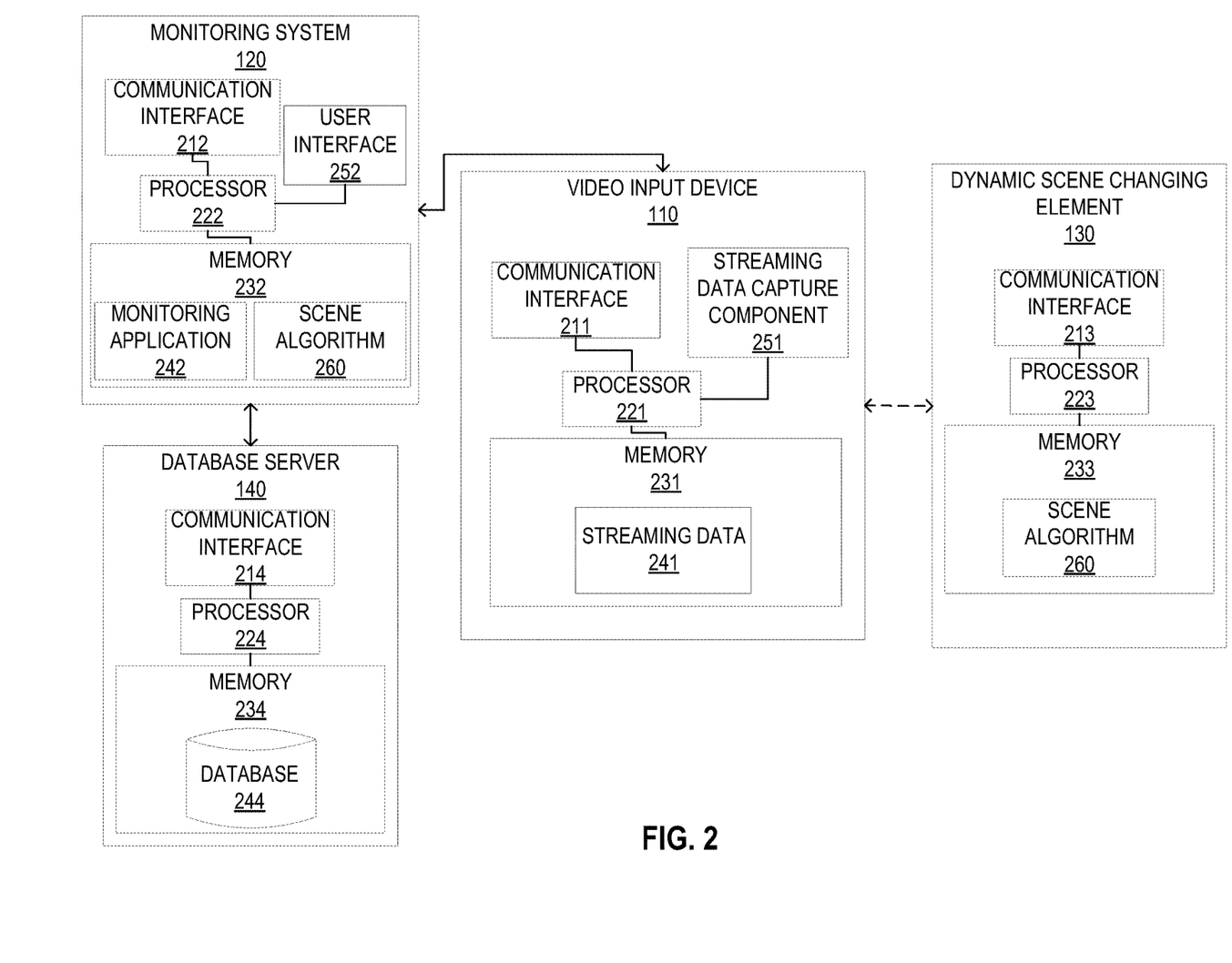
FIG. 2 is a block diagram illustrating the video input device, monitoring system, dynamic scene changing element, and the database server in more detail, in accordance with some embodiments of the present disclosure.

FIG. 2 is a block diagram illustrating the video input device 110, monitoring system 120, dynamic scene changing element 130, and the database server 140 in more detail, in accordance with some embodiments of the present disclosure. The video input device 110 may comprise a processor 221 communicably coupled to such devices as a communication interface 211 and a memory 231. The processor 221, and other processors described herein, typically includes circuitry for implementing communication and/or logic functions of the computing systems or devices within the video data authentication system. For example, the processor 221 may include a digital signal processor device, a microprocessor device, and various analog to digital converters, digital to analog converters, and/or other support circuits. The entity authentication server 110 may use the communication interface 211 to communicate with other devices over the network 180. The communication interface 211 as used herein may include an Ethernet interface, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The processor 221 may further be in operative communication with a streaming data capture component 251, which is a component of the video input device 110 that collects streaming video, image, and/or audio data from environments in the proximity of the video input device 110. Accordingly, the streaming data capture component 251 may comprise a motion video camera, still photographic camera, microphone or other audio capture device, and the like. In some embodiments, the streaming data capture component 251 may further comprise non-visible light sensors and/or non-audible sound sensors.

The memory 231 of the video input device 110 may comprise streaming data 241 obtained through the streaming data capture component 251. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. The streaming data 241 may include video, image, and/or audio data. Typically, the streaming data 241 includes video, image, and/or audio data of a scene that the entity wishes to maintain under surveillance. Accordingly, the memory 231 may be a media buffer such that the streaming data 241 is only temporarily stored on the video input device 110. In other embodiments, the memory 231 may be non-volatile storage such that the streaming data 241 is maintained within the video input device 110.

The monitoring system 120 may represent a computing system or multiple computing systems which facilitate the surveillance of a scene or object of interest. Accordingly, the monitoring system 120 may be a desktop computer, networked terminal, laptop computer, tablet, smartphone, or the like, which is configured to receive streaming data 241 from the video input device 110. The monitoring system 120 comprise a communication interface 212, a processor 222, and a memory 232 having a monitoring application 242 stored thereon. The monitoring system 120 may further comprise a system clock which tracks the system time (e.g., Unix system time). In some embodiments, the system clock may be synchronized with an external timekeeping server and/or the dynamic scene changing element 130.

The monitoring application 242 may comprise logic and/or code to coordinate receiving the streaming data 241 from the video input device 110. The monitoring application 242 may further comprise logic and/or code to process and analyze the streaming data 241, record events, generate alerts, and the like. The memory 232 may further comprise a scene algorithm 260 which produces certain expected values based on input values (e.g., system time, device ID, etc.). By using the scene algorithm 260, the monitoring system 120 may calculate expected values and compare the expected values with the streaming data 241 (e.g., the monitoring system 120 checks the streaming data 241 to ensure that the streaming data 241 contains the expected values in the expected place).

The processor 225 may further be in operative communication with a user interface 252, where the user interface 252 may comprise the hardware and software implements to accept input from and provide output to the user. Accordingly, the user interface 252 may comprise hardware such as a display, audio output devices, projectors, and the like, or input devices such as keyboards, mice, sensors, cameras, microphones, biometric input devices (e.g., fingerprint readers), and the like. The user interface 252 may further comprise software such as a graphical or command-line interface through which the user may provide inputs and/or receive outputs from the monitoring system 120. It should be understood that the display on which the user interface 252 is presented may include an integrated display (e.g. a tablet or smartphone screen) within the monitoring system 120, or an external display device (e.g. a computer monitor or television). In some embodiments, the user interface 252 may further include other peripheral hardware components, such as audio alarms, light alarms, and the like, which may alert the user to potential mismatches of expected values and values detected in the streaming data 241 by the monitoring system 120.

In some embodiments, the monitoring system 120 may be in operative communication with a database server 140. The database server 140 may comprise a processor 224 in operative communication with a communication interface 214 and a memory 234 having a database 244 stored thereon. The database 244 may comprise at least a portion of the streaming data 241 collected by the monitoring system 120 from the video input device 110.

The dynamic scene changing element 130 may be a device that creates a change within the scene (e.g., a visual or audio change, or the like) or object under surveillance by the entity. Accordingly, the dynamic scene changing element 130 may be a digital display, light emitter, sound emitter, choreographed object, or the like. The dynamic scene changing element 130 may comprise a processor 223 in operative communication with a communication interface 213 and a memory 233 having the scene algorithm 260 stored thereon. Typically, the scene algorithm 260 of the dynamic scene changing element 130 is the same scene algorithm 260 stored on the monitoring system 120. The dynamic scene changing element 130 may further comprise a system clock to allow the dynamic scene changing element 130 to keep track of system time. By using the system time as a seed input value to the scene algorithm 260, the dynamic scene changing element 130 may make various changes to the scene based on the output of the scene algorithm 260 for a given time or timeframe (e.g., displaying different values, emitting light or sound having various properties, physically moving in different directions, orientations, or timings, and the like). Accordingly, the dynamic scene changing element 130 may further comprise various additional components depending on its type. For instance, if the dynamic scene changing element 130 is a digital display, the dynamic screen changing element 130 may comprise one or more screens, projectors, dot matrix displays, and the like. If the dynamic scene changing element 130 is a choreographed object, the dynamic scene changing element 130 may include motors, articulating appendages, rotating wheels, and the like. If the dynamic scene changing element 130 is a sound emitter, the dynamic scene changing element 130 may include one or more speakers, tweeters, or other types of sound producing components.

Figure 3:
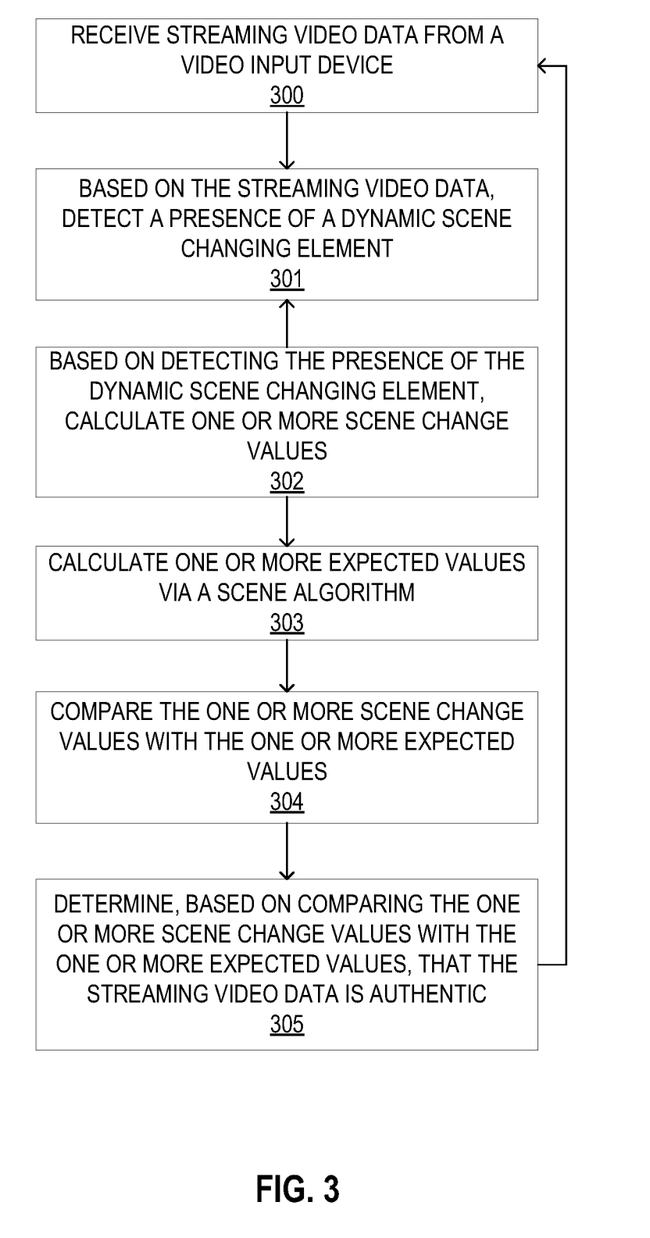
FIG. 3 is a process flow for the real-time video data authentication system, in accordance with some embodiments of the present disclosure.

FIG. 3 is a process flow for the real-time video data authentication system, in accordance with some embodiments of the present disclosure. The process begins at block 300, where the system receives streaming video data from a video input device 110. In some embodiments, the system may receive streaming video data in real time. In other embodiments, the system may store the streaming video data within a database for further review at a later time. Typically, the video input device 110 is positioned, angled, and/or oriented to capture streaming data (e.g., video, image, and/or audio data) of a location or object that the entity wishes to maintain under surveillance (which may be referred to as the "scene 150"). For example, the video input device 110 may be a security camera which may be configured to capture footage of a particular location (e.g., a room or hallway) or an object (e.g., a valuable artifact, safe box, restricted control panel, etc.). In some embodiments, the system may be configured to receive streaming data from multiple video input devices 110. In some embodiments, multiple video input devices 110 may be assigned to one particular scene 150. In other embodiments, each video input device 110 may be assigned to a different scene 150. In yet other embodiments, one scene 150 may be assigned multiple video input devices 110 (e.g., a high priority location or object), while others may be assigned one video input device 110 (e.g., a relatively lower priority location or object).

The process continues to block 301, where the system, based on the streaming video data, detects a presence of a dynamic scene changing element 130. Typically, the dynamic scene changing element 130 is located within the scene 150 to be monitored. In some embodiments, the dynamic scene changing element 130 may be a physical device, such as a digital display, light emitter, sound emitter, choreographed object, or the like. In other embodiments, the dynamic scene changing element 130 may be a non-physical object such as a projected image. In such embodiments, the dynamic scene changing element may be projected onto the scene 150 by a dynamic element device (e.g., that is an in-scene device, an off-scene device, or combination thereof). The dynamic scene changing element 130 may be configured to create changes in the streaming data collected of the scene 150 (e.g., changes in video, image, and/or audio data). The way in which said changes are made may differ depending on the type of dynamic scene changing element 130. For instance, a digital display may change the video or image data by displaying various different values (e.g., a character string, a numerical value, a symbol, or the like). Emitted light may change the video or image data by varying in intensity, color, timing (e.g., on or off at a particular point in time), or the like. Sound emitters may make changes to the audio data by emitting sound of various intensities, frequencies, and/or timing.

The dynamic scene changing element 130 may be configured to make said changes based on the output of a scene algorithm. Typically, the dynamic scene changing element 130 (the device which projects the dynamic scene changing element, or the monitoring system) may input one or more seed values (e.g., the time of day) into the scene algorithm. In some embodiments, other values may be input into the scene algorithm, such as a device ID (e.g., a string of characters unique to a device, such as the video input device), an entity ID (e.g., a string that uniquely corresponds to the entity that is using the video data authentication system), or the like. Based on the inputs, an output value from the scene algorithm may be calculated, where the output value may correspond to various changes in configuration of the dynamic scene changing element 130. For instance, certain output values may correspond to the display of a particular character string, or a light beam of a certain intensity, or a particular image. In an exemplary embodiment, the dynamic scene changing element 130 may be a colored light emitter which detects that the output of the scene algorithm for a given timeframe is "DAA520." Based on this output, the dynamic scene changing element 130 may emit light having a color that corresponds to the output value (e.g., goldenrod). In such embodiments, the monitoring system may be configured to detect that the emitted light belongs to a certain acceptable range of colors (e.g., the detected light is yellow). In another example, the dynamic scene changing element 130 may be a digital display which detects that the output value of the scene algorithm is "3FE20DB1." Based on this output, the digital display may update itself to display the character string of "3FE20DB1."

The process continues to block 302, where the system, based on detecting the presence of the dynamic scene changing element 130, calculates one or more scene change values. By changing its configuration, the dynamic scene changing element 130 may create detectable changes in the streaming data. Said changes in the streaming data may be recognized by the system as "scene change values," i.e., the values calculated from the changes to the streaming data caused by the dynamic scene changing element 130. For instance, if the dynamic scene changing element 130 is configured to display a particular value at a particular time (e.g., a character string such as "3FE20DB1"), the system may recognize the character string (e.g., using OCR technology) and set the scene change values to match the character string. In other embodiments, if the dynamic scene changing element 130 is configured to display light of a particular color (e.g., goldenrod) or a particular image (e.g., an octagon), the system may detect the color, range of colors, or shape and map the color, range of colors, or shape to a unique value (e.g., the color of the light is "goldenrod," which is mapped to a range of scene change values corresponding to the color "yellow"). The scene change values may be unique to a particular time or timeframe, such that unauthorized parties may find it difficult to predict what the scene change value should be for a given time or timeframe.

In some embodiments, the system may be unable to detect the dynamic scene changing element within the streaming data (e.g., the line of vision between the video input device and the dynamic scene changing element 130 is obstructed, the streaming data is of low quality/fidelity due to technical issues such as network latency, etc.). Upon detecting that the dynamic scene changing element is missing from the streaming data for a threshold period of time, the system may generate an alert to notify a user (e.g., security staff/personnel) of the issue. As such, in some embodiments the invention may allow for a missing dynamic scene changing element 130 for a period of time before generating an alert. In some embodiments, the system may use multiple video input devices 110 to capture streaming data of a scene from different positions and angles. For instance, the system may position and orient multiple security cameras such that if the view of the dynamic scene changing element 130 is obstructed with respect to one security camera, another security camera may be able to maintain a view of the dynamic scene changing element 130 from a different position and/or angle. In some embodiments, the system may be configured to generate an alert if the view of the dynamic scene changing element 130 is obstructed with respect to all video input devices 110. In this way, so long as at least one video input device 110 is able to capture streaming data of the dynamic scene changing element 130, the system may be sufficiently able to detect the necessary scene change values to ensure the authenticity of the streaming data.

The process continues to block 303, where the system calculates one or more expected values via a scene algorithm. Typically, the system uses the same scene algorithm and input values (e.g., the time, device ID, etc.) as the ones used by the dynamic scene changing element. The system clock may also be synchronized with the internal clock of the dynamic scene changing element. By using the same scene algorithm and seed input values, the system is able to calculate an expected value which exactly matches the output value calculated by the dynamic scene changing element in step 301. In this way, the system is able to predict the exact value and sequence of values for a given time or period of time. On the other hand, the scene algorithm may be a one-way algorithm (e.g., a hash function) such that the exact identity of the hash algorithm may not readily be derived from the output values. Accordingly, parties that are unable to access or use the scene algorithm (e.g., unauthorized users) may not be able to determine the appropriate scene change values for any given time or period of time.

The process continues to block 304, where the system compares the one or more scene change values with the one or more expected values. At this stage, the system has determined a scene change value from the streaming data and calculated an expected value based on the scene algorithm. If the scene change value matches the expected value, then the system may determine that the streaming data accurately represents the scene as it exists or existed at a particular point in time (e.g., current time).

However, if the scene change value does not match the expected value or is altogether missing (e.g., the expected value is "3FE20DB1" but the detected scene change value is "7CEB25", or the expected value corresponds to the color "goldenrod," but the detected scene change value corresponds to the color "cerulean"), the system may determine that the streaming video data has been delayed, altered or corrupted, and further determine that the streaming data does not accurately reflect the scene as it exists or existed at a particular point in time. In some embodiments, the system may further take into account the location within the streaming data in which the scene change value was detected. For example, if the video input device is a fixed security camera, the dynamic scene changing element may be positioned such that it appears in a consistent location within the video footage recorded by the security camera (e.g., the bottom left corner). If the system detects that the dynamic scene changing element has moved with respect to the streaming video footage (e.g., the dynamic scene changing element now appears in the bottom right corner), the system may determine that the detected scene change value does not match the expected value.

Upon detecting that the expected value does not match the scene change value, the system may generate an alert such as an audible alert (e.g., a buzzer, alarm, siren, voice message, etc.), visual alert (e.g., error message, light alert, etc.), or the like. In some embodiments, the system may be configured to push a notification to one or more user devices (e.g., mobile device, smartphone, smart device, 2-way radio, pager, beeper, etc.) operated by one or more users (e.g., security staff) which notifies the user and prompts the user to resolve the issue.

The process concludes at block 305, where the system determines, based on comparing the one or more scene change values with the one or more expected values, that the streaming video data is authentic. Once the system has determined that the expected value matches the scene change value for a particular time or period of time, the process may loop back to block 300 to restart the process. The dynamic scene changing element may, in some embodiments, be configured to recalculate output values using the scene algorithm at certain intervals (e.g., once per second). Once the threshold amount of time has elapsed (e.g., one second), the dynamic scene changing element may recalculate an output value using a new seed value which reflects the current time. In some embodiments, the seed value may be selected by the entity. Based on the output value, the dynamic scene changing element may create further changes in the scene. This process may continue for as long as the entity wishes to monitor a particular scene or object.

In some embodiments, the system may be configured to disable one or more communication interfaces of the monitoring system, video input device, and/or the dynamic scene changing element either initially or after the seed input values are input into the scene algorithm. For example, the system may be configured to disable WiFi, Bluetooth, and/or USB connections for the dynamic scene changing element, thereby preventing the dynamic scene changing element from receiving input or producing outputs through the disabled interfaces. In this way, the system is able to minimize the potential attack surfaces of the authentication system.

By using a dynamic scene changing element as described above, the system may be able to prevent security attacks based on manipulation of video security data. In particular, so long as the potential attacker does not have access to the scene algorithms and/or the seed input values, the potential attacker will not be able to predict the appropriate scene change values for a particular point in time. Thus, even if the attacker were to manipulate the streaming video data (e.g., by placing a still image of the scene over the lens of the video input device, by intercepting the streaming video data and using software manipulation techniques such as a previously recorded video loop of the scene, or the like), the attacker may be unable to manipulate the dynamic scene changing element or the streaming video data to contain the appropriate scene change values. In this way, the monitoring system to detect that a security attack has occurred if a still image attack or video loop attack is attempted.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authentication of video data using dynamic scene changing, comprising:
   a processor;
   a communication interface; and
   a memory having executable code stored therein, wherein the executable code, when executed by the processor, causes the processor to:
      receive streaming video data from a video input device;
      based on the streaming video data, detect a presence of a dynamic scene changing element;
      based on detecting the presence of the dynamic scene changing element, calculate one or more scene change values;
      calculate one or more expected values via a scene algorithm;
      compare the one or more scene change values with the one or more expected values;
      determine, based on comparing the one or more scene change values with the one or more expected values, that the streaming video data is authentic;
      detect, via the streaming video data, the change in configuration of the dynamic scene changing element;
      based on detecting the change in configuration of the dynamic scene changing element, calculate a second set of one or more scene change values;
      calculate a second set of one or more expected values via the scene algorithm;
      compare the second set of one or more scene change values with the second set of one or more expected values;
      determine that the streaming video data is not authentic based on comparing the second set of one or more scene change values with the second set of one or more expected values; and
      generate an alert configured to notify a user that the streaming video data is not authentic.

2. The system of claim 1, wherein calculating the one or more expected values via the scene algorithm comprises providing one or more input values into the scene algorithm, the one or more input values comprising a seed input value, wherein the dynamic scene changing element is configured to:
   calculate an output value by providing the one or more input values to the scene algorithm; and
   based on the output value, create a change in configuration of the dynamic scene changing element.

3. The system of claim 2, wherein the dynamic scene changing element is a digital display configured to display a string of characters corresponding to the output value, wherein calculating the one or more scene change values comprises:
   detecting the string of characters within the streaming video data; and
   determining a value of the string of characters,
   wherein comparing the one or more scene change values with the one or more expected values comprises determining whether the value of the string of characters matches an expected value.

4. The system of claim 1, wherein the video input device is a fixed security camera, wherein comparing the one or more scene change values with the one or more expected values comprises detecting a location of the dynamic scene changing element within the streaming video data.

5. The system of claim 2, wherein the dynamic scene changing element is a visible light emitter configured to emit light of a specified color, wherein the specified color corresponds to a specified output value.

6. The system of claim 2, wherein the dynamic scene changing element is a choreographed object configured to change in orientation based on a specified output value.

7. The system of claim 2, wherein the dynamic scene changing element is a sound emitter configured to emit sound of a specified frequency, wherein the specified frequency corresponds to a specified output value.

8. The system of claim 2, wherein the system further comprises a system clock, the system clock being synchronized with a system clock of the dynamic scene changing element, wherein the one or more input values comprises a current time determined by the system clock.

9. The system of claim 2, wherein the dynamic scene changing element is an infrared emitter configured to generate a heat signature, wherein the system further comprises an infrared sensor configured to detect the heat signature, wherein the heat signature correspond to a specified output value.

10. The system of claim 2, further comprising a second monitoring system comprising:
    a second processor;
    a second communication interface; and
    a second memory having executable code stored therein, wherein the executable code, when executed by the second processor, causes the second processor to:
       shut off the second communication interface;
       receive a second set of streaming video data from a second video input device, wherein the second video input device is configured to record a display of a first monitoring system;
       based on the second set of streaming video data, detect the presence of the dynamic scene changing element;
       based on detecting the presence of the dynamic scene changing element, calculate one or more additional scene change values;
       calculate the one or more expected values via the scene algorithm; and
       compare the one or more additional scene change values with the one or more expected values.

11. A computer program product for authentication of video data using dynamic scene changing, the computer program product comprising at least one non-transitory computer readable medium having computer-readable program code portions embodied therein, the computer-readable program code portions comprising:
    an executable portion for receiving streaming video data from a video input device;
    an executable portion for, based on the streaming video data, detecting a presence of a dynamic scene changing element;
    an executable portion for, based on detecting the presence of the dynamic scene changing element, calculating one or more scene change values;
    an executable portion for calculating one or more expected values via a scene algorithm;
    an executable portion for comparing the one or more scene change values with the one or more expected values;
    an executable portion for determining, based on comparing the one or more scene change values with the one or more expected values, that the streaming video data is authentic;
    an executable portion for detecting, via the streaming video data, the change in configuration of the dynamic scene changing element;
    an executable portion for, based on detecting the change in configuration of the dynamic scene changing element, calculating a second set of one or more scene change values;
    an executable portion for calculating a second set of one or more expected values via the scene algorithm;
    an executable portion for comparing the second set of one or more scene change values with the second set of one or more expected values;
    an executable portion for, based on comparing the second set of one or more scene change values with the second set of one or more expected values, determining that the streaming video data is not authentic; and
    an executable portion for generating an alert configured to notify a user that the streaming video data is not authentic.

12. The computer program product of claim 11, wherein calculating the one or more expected values via the scene algorithm comprises providing one or more input values into the scene algorithm, the one or more input values comprising a seed input value, wherein the dynamic scene changing element is configured to:
    calculate an output value by providing the seed input value to the scene algorithm; and
    based on the output value, create a change in configuration of the dynamic scene changing element.

13. The computer program product of claim 12, wherein the dynamic scene changing element is a digital display configured to display a string of characters corresponding to the output value, wherein calculating the one or more scene change values comprises:
    detecting the string of characters within the streaming video data; and
    determining a value of the string of characters,
    wherein comparing the one or more scene change values with the one or more expected values comprises determining whether the value of the string of characters matches an expected value.

14. A computer-implemented method for authentication of video data using dynamic scene changing, the method comprising:
    receiving streaming video data from a video input device;
    based on the streaming video data, detecting a presence of a dynamic scene changing element;
    based on detecting the presence of the dynamic scene changing element, calculating one or more scene change values;
    calculating one or more expected values via a scene algorithm;
    comparing the one or more scene change values with the one or more expected values;
    determining, based on comparing the one or more scene change values with the one or more expected values, that the streaming video data is authentic;
    detecting, via the streaming video data, the change in configuration of the dynamic scene changing element;
    calculating a second set of one or more scene change values based on detecting the change in configuration of the dynamic scene changing element;
    calculating a second set of one or more expected values via the scene algorithm;
    comparing the second set of one or more scene change values with the second set of one or more expected values;
    determining that the streaming video data is not authentic based on comparing the second set of one or more scene change values with the second set of one or more expected values; and
    generating an alert configured to notify a user that the streaming video data is not authentic.

15. The computer-implemented method of claim 14, wherein calculating the one or more expected values via the scene algorithm comprises providing one or more input values into the scene algorithm, the one or more input values comprising a seed input value, wherein the dynamic scene changing element is configured to:
    calculate an output value by providing the seed input value to the scene algorithm; and
    based on the output value, create a change in configuration of the dynamic scene changing element.

16. The computer-implemented method of claim 15, wherein the dynamic scene changing element is a digital display configured to display a string of characters corresponding to the output value, wherein calculating the one or more scene change values comprises:
    detecting the string of characters within the streaming video data; and
    determining a value of the string of characters,
    wherein comparing the one or more scene change values with the one or more expected values comprises determining whether the value of the string of characters matches an expected value.

* * * * *